United States Patent
Von Zitzewitz et al.

(10) Patent No.: US 9,360,331 B2
(45) Date of Patent: Jun. 7, 2016

(54) TRANSFER OF DATA FROM IMAGE-DATA-BASED MAP SERVICES INTO AN ASSISTANCE SYSTEM

(75) Inventors: Henning Von Zitzewitz, Hildesheim (DE); Karsten Muehlmann, Stuttgart (DE); Jan Egelhaaf, Leonberg (DE); Peter Preissler, Dorndorf (DE); Markus Becker, Tamm (DE); Philipp Lehner, Muehlacker (DE); Michael Schumann, Stuttgart (DE); Volker Niemz, Rutesheim (DE); Raphael Cano, Stuttgart (DE); Leo Vepa, Ulm (DE); Pascal Kanter, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 14/353,117

(22) PCT Filed: Aug. 28, 2012

(86) PCT No.: PCT/EP2012/066639
§ 371 (c)(1),
(2), (4) Date: Sep. 25, 2014

(87) PCT Pub. No.: WO2013/056884
PCT Pub. Date: Apr. 25, 2013

(65) Prior Publication Data
US 2015/0057920 A1 Feb. 26, 2015

(30) Foreign Application Priority Data
Oct. 21, 2011 (DE) .......... 10 2011 084 993

(51) Int. Cl.
*G01C 21/34* (2006.01)
*G06F 17/30* (2006.01)
(Continued)

(52) U.S. Cl.
CPC .......... *G01C 21/34* (2013.01); *G06F 17/30241* (2013.01); *G06F 17/30277* (2013.01); *G08G 1/165* (2013.01); *G08G 1/166* (2013.01); *G08G 1/168* (2013.01)

(58) Field of Classification Search
CPC .......... G01C 21/26; G01C 21/34; G08G 1/14; H04N 7/18
USPC ................. 701/409, 412, 430, 439, 446, 458; 348/148
See application file for complete search history.

(56) References Cited

U.S. PATENT DOCUMENTS 6,429,789 B1 * 8/2002 Kiridena et al. ............... 340/905
6,853,913 B2 * 2/2005 Cherveny et al. ............. 701/461
(Continued)

FOREIGN PATENT DOCUMENTS

CN 101241188 A 8/2008
CN 101395645 A 3/2009
(Continued)

OTHER PUBLICATIONS

International Search Report, PCT International Application No. PCT/EP2012/066639, dated Nov. 22, 2012.

*Primary Examiner* — Tan Q Nguyen
(74) *Attorney, Agent, or Firm* — Norton Rose Fulbright US LLP

(57) ABSTRACT

A method for transferring data from an image-data-based map service for use in an assistance system of a vehicle includes the following: ascertaining the position and/or orientation of the vehicle, retrieving image data of the vehicle surroundings from the image-data-based map service, extracting items of information from the image data of the map service, and transferring the items of information into the assistance system.

18 Claims, 3 Drawing Sheets

(51) Int. Cl.
*G08G 1/16* (2006.01)
*G08G 1/14* (2006.01)

(56) References Cited

U.S. PATENT DOCUMENTS

| | | | |
|---|---|---|---|
| 7,363,151 B2 * | 4/2008 | Nomura et al. | 701/445 |
| 7,447,573 B2 | 11/2008 | Hiwatashi et al. | |
| 7,728,869 B2 * | 6/2010 | Jung | 348/113 |
| 8,284,995 B2 | 10/2012 | Diaz et al. | |
| 8,289,391 B2 * | 10/2012 | Kiyohara et al. | 348/148 |
| 2007/0057816 A1 | 3/2007 | Sakakibara et al. | |
| 2009/0228204 A1 * | 9/2009 | Zavoli et al. | 701/208 |
| 2011/0032119 A1 * | 2/2011 | Pfeiffer et al. | 340/905 |
| 2011/0143779 A1 | 6/2011 | Rowe et al. | |
| 2012/0176410 A1 | 7/2012 | Meier et al. | |
| 2013/0191022 A1 * | 7/2013 | Mathes et al. | 701/532 |

FOREIGN PATENT DOCUMENTS

| | | |
|---|---|---|
| CN | 101910791 A | 12/2010 |
| DE | 102 48 534 | 4/2004 |
| DE | 10 2006 040 605 | 5/2007 |
| DE | 60 2004 006 821 | 2/2008 |
| DE | 10 2008 007 687 | 8/2009 |
| DE | 10 2009 005 566 | 10/2009 |
| DE | 10 2009 018 073 | 1/2010 |
| DE | 10 2009 037 835 | 2/2011 |
| DE | 10 2009 051 463 | 5/2011 |
| DE | 10 2010 034 140 | 2/2012 |
| EP | 1 283 406 | 2/2003 |
| JP | 2008139320 A | 6/2008 |
| JP | 2009061795 A | 3/2009 |
| JP | 2010515135 A | 5/2010 |
| JP | 2010257253 A | 11/2010 |

* cited by examiner

TRANSFER OF DATA FROM IMAGE-DATA-BASED MAP SERVICES INTO AN ASSISTANCE SYSTEM

FIELD

The present invention relates to a method for the transfer of data from image-data-based map services for use in an assistance system of a vehicle. Furthermore, the present invention relates to a computer program product and to a device for carrying out the method.

BACKGROUND INFORMATION

Various assistance systems are used in the automotive field to assist the driver during driving of the vehicle. Typical fields of use for such assistance systems include, for example, navigation systems, which supply the driver with relevant information to facilitate route guidance. Additional assistance systems assist the driver during parking, for example, by carrying out steering interventions or by displaying suitable steering angles. Additional assistance systems provide the driver with a visual display of the vehicle surroundings, which is recorded with the aid of cameras attached to the vehicle and/or other surroundings sensors. All of the mentioned assistance systems require for their function the most exact data possible about the surroundings of the vehicle.

A method for preparing a map of the surroundings of a vehicle with the aid of a surroundings sensor system is described in German Patent Application No. DE 10 2009 005 566 A1, the surroundings sensor system having an ultrasound sensor system and at least one image-generating camera system for the detection of objects in the surroundings of the vehicle.

Measured data of the ultrasound sensor system and the measured data of the camera system are entered in a shared map. These map data are used to assist the driver during parking procedures, maneuvering, or driving in narrow passages or in constricted surroundings.

German Patent Application No. DE 10 2009 037 835 A1 describes a method for the ergonomic display of virtual information in real surroundings. The items of virtual information are overlaid in a display device in at least a part of the view of the real surroundings in consideration of position and orientation. The degree of reality of the overlay may be increased, in that the items of virtual information are overlaid with images of the surroundings (for example, the points of interest). Surroundings maps are used, the items of information being extracted from Google Street View, for example, and considered dynamically, in relation to the location.

A method for the precise position determination of a mobile terminal is described in German Patent No. DE 102 48 534 A1. The mobile terminal records images or image sequences of surroundings, in which the user is located, via an optical recording device. The recorded images or image sequences are transmitted together with position data and data on the setting of the mobile terminal and the associated camera to a position and navigation server. The data and images or image sequences entered therein are compared to images or image sequences from an image database, which contains exact surveying data for the images. From the image comparison, in which algorithms known from video monitoring are used, the exact position of the mobile terminal is ascertained and transmitted back thereto.

German Patent Application No. DE 10 2009 018 073 A1 describes a method for updating a geographic database. It is established via items of information provided by a navigation system whether a vehicle is located on a road. A geographically coded image is then produced while using a camera installed in the vehicle. The analysis of the geographically coded image includes a comparison of the image to stored photorealistic image data, to establish whether an update of the geographic database is necessary.

In the case of conventional assistance systems having a connection to an image database or to an image-data-based map service, the connection is used to supplement the representation of the surroundings using images from a database, or to carry out a comparison of the surroundings data of the vehicle. The items of information from the image database or the image-data-based map service may not be used in the methods known from the related art for further tasks of the assistance systems, for example, finding parking spaces.

SUMMARY

According to the present invention, an example method for the transfer of data from an image-data-based map service for use in an assistance system of a vehicle having the following method steps is provided, which includes:
a. ascertaining the position of the vehicle,
b. retrieving image data of the vehicle surroundings from the image-data-based map service,
c. extracting items of information from the image data of the map service,
d. transferring the items of information into the assistance system.

In first method step a), the position and optionally also the orientation of the vehicle are ascertained. Any suitable method or also a combination of multiple methods may be used for this purpose.

A suitable method for ascertaining the vehicle position is the use of a radio-based and/or satellite-based navigation system, for example, the global positioning system (GPS). If the vehicle moves and if the vehicle position is continuously ascertained via the navigation system, the movement direction of the vehicle and therefore the orientation may be ascertained.

Another suitable method for ascertaining the vehicle position uses the image-data-based map service. For this purpose, camera images of the surroundings of the vehicle are compared to the image-data-based map service. The vehicle is equipped for this purpose with one or multiple cameras, which record at least one detail of the surroundings of the vehicle, or already provided cameras are used. The connection to the image-data-based map service is implemented via a database. The database is stored, for example, on a machine-readable storage medium, for example, on a permanent or rewritable storage medium or on a removable CD-ROM, DVD, or a USB stick. In addition, the database may be provided on a computer unit such as a server for download, for example, via a data network such as the Internet or a communication connection, for example, a telephone line or a wireless connection. The actual comparison of the image data of the map service to the camera images is carried out while using algorithms known to those skilled in the art and may be carried out either in a control unit of the assistance system or on a remote computer unit such as a server. If the comparison is carried out in the assistance system, the database is provided to the assistance system on a machine-readable storage medium. If the comparison is carried out on a remote server, a communication connection is provided to the control unit and the camera images of the surroundings of the vehicle are transmitted via this communication connection to the server.

The result of the comparison is transmitted back to the control unit via the same communication connection.

The images stored in the database of the image-data-based map service are provided with items of information about the location of the recording and the orientation. Therefore, the orientation of the vehicle may also be ascertained in the case of the position determination.

In one preferred specific embodiment of the method, the vehicle position is first roughly ascertained with the aid of GPS and subsequently refined with the aid of the image data of the map service. A preselection of the image data to be compared may already be carried out by the prior rough localization with the aid of GPS and the effort for the comparison of the image data is substantially reduced.

The orientation of the vehicle may also be ascertained via sensor systems, for example, a compass.

In second method step b), image data of the vehicle surroundings are retrieved from the image-data-based map service. Since the position and orientation of the vehicle are known, the retrieved image data may be classified in a map of the surroundings of the vehicle. Examples of image-data-based map services are the services offered under the names Google Street View, Google Maps, and Google Earth. It is also conceivable to retrieve data from multiple image-data-based map services.

In one specific embodiment of the method, the image data retrieved from the map service are supplemented by camera images of the vehicle surroundings. The vehicle is equipped for this purpose with one or multiple cameras, for example, a front camera, a rear camera, and a side camera on each side. Cameras already provided for reversing assistants may also be used, for example.

In another specific embodiment of the method, the image data of the map service, which have optionally already been supplemented by camera images of the vehicle surroundings, are supplemented using surroundings data recorded with the aid of surroundings sensors. Suitable surroundings sensors on the vehicle are, for example, ultrasound sensors, lidar sensors, or radar sensors, as are conventionally used for measuring distances and for detecting objects in the surroundings of a vehicle.

In third step c) of the example method according to the present invention, items of information are extracted from the image data of the map service, which have optionally been supplemented using camera images and/or surroundings data. With the aid of conventional algorithms for image processing and object recognition, in one specific embodiment of the method, parking spaces in the surroundings of the vehicle and optionally the size and orientation thereof are ascertained.

Additionally or alternatively, further items of information may also be extracted. In the image data of the image-data-based map service, which are optionally supplemented using camera images, in one specific embodiment of the method, traffic signs are identified. For example, areas in the surroundings of the vehicle which are unsuitable as a parking space may be identified from signs relating to no stopping and no parking zones. In another specific embodiment of the present invention, the location and size of obstructions, in particular of trees, the location and height of the curb, and/or the traffic routing, in particular the type and location of intersections, may additionally or alternatively be ascertained and analyzed from the image data of the image-data-based map service, which are supplemented using camera images and optionally surroundings data. If camera images are available, it is additionally possible to differentiate between moving objects and stationary objects by an analysis of a sequence of camera images.

In one specific embodiment of the present invention, the image data of the image-data-based map service are updated if changes are recognized upon the comparison of the image data to the camera images and/or to the surroundings data recorded with the aid of the surroundings sensors.

In one specific embodiment of the method, the image data of the image-data-based map service are only updated if the change recognized by the comparison of the image data has been recognized multiple times, preferably at least three times. Every recognition of a change must be independent of one another, i.e., for example, it must be recognized by two sensor systems independent of one another or during two different passings of the vehicle.

In last step d) of the example method, the items of information which have been extracted from the optionally supplemented image data of the image-data-based map system are transferred into the assistance system. The assistance system may be designed, for example, as a navigation system and/or as a parking assistance system. In one specific embodiment of the method, an image is prepared from the image data of the map service, which have optionally been supplemented by camera images and surroundings data, and also from items of information obtained therefrom. This image is displayed to the driver via a suitable display, the image display preferably being designed as a bird's eye view or as a 3-D view. In the case of the display as a bird's eye view, the surroundings of the vehicle are displayed to the driver from an elevated position, so that a clear and simple, comprehensible display results. The image display preferably contains items of information about possible parking spaces in the surroundings of the vehicle. Since the assistance system has items of information on the location, orientation, and size of the parking space and about obstructions located in the surroundings of the vehicle, a parking maneuver guided by the assistance system may be implemented easily.

In one specific embodiment of the method, the image display is designed in such a way that it may be enlarged or reduced in size. It is preferable in this case if, in the event of a reduction in size of the image display, a seamless transition to an image display produced exclusively from image data of the map service is carried out.

The extracted items of information may also be used for additional assistance systems. A navigation system may use items of information about upcoming lanes, for example, to provide more precise driving suggestions to the driver. The items of information may also be used in intervening assistance systems, which inform the driver, for example, about speed limits, pedestrian crossings, and the like. The use of the extracted items of information for systems which permit fully autonomous driving is also conceivable.

Furthermore, a computer program for carrying out one of the methods described herein, when the computer program is run on a programmable computer unit, is provided according to the present invention. The computer unit may be, for example, a module or a control unit for implementing individual assistance systems or a subsystem thereof in a vehicle. The computer program may be stored on a machine-readable storage medium, for example, on a permanent or rewritable storage medium or in association with a computer unit, or on a removable CD-ROM, DVD, or a USB stick. Additionally or alternatively, the computer program may be provided on a computer unit such as a server for download, for example, via a data network such as the Internet or a communication connection, either a telephone line or a wireless connection.

Furthermore, a device is provided according to the present invention, which is configured to carry out the above-described method. The device includes a control unit, at least one camera, and optionally additional surroundings sensors, for example, ultrasound sensors, lidar sensors, or radar sensors, for detecting the surroundings of the vehicle, the control unit having a connection to an image-data-based map service. Furthermore, the device may include additional sensors, for example, an infrared sensor system or a position sensor, such as a GPS sensor. If an image display for the driver is provided in the case of the method, the device furthermore includes a means for displaying items of image information, for example, a flat display screen.

The present invention allows the extraction of items of information from the image data of an image-data-based map service, in order to use these items of information in an assistance system of a vehicle. Assistance systems, for example, parking aids, also receive in this way items of information about the surroundings of the vehicle, which are not presently in the field of vision of the sensors of the vehicle and are therefore not presently visible. The assistance systems may thus plan more precisely and make the driver aware of possible hazards earlier. A parking aid implemented by the assistance system according to the present invention may use this, for example, to inform the driver before he travels past possible parking spaces and may also offer possible parking spaces to the driver which are not presently in the field of vision of the vehicle. Since a determination of the orientation of a parking space is also possible with the aid of the image data, the user of a parking aid is relieved, since he does not have to input the correct orientation of the parking space by hand into the assistance system.

DETAILED DESCRIPTION OF EXAMPLE EMBODIMENTS

Figure 1:
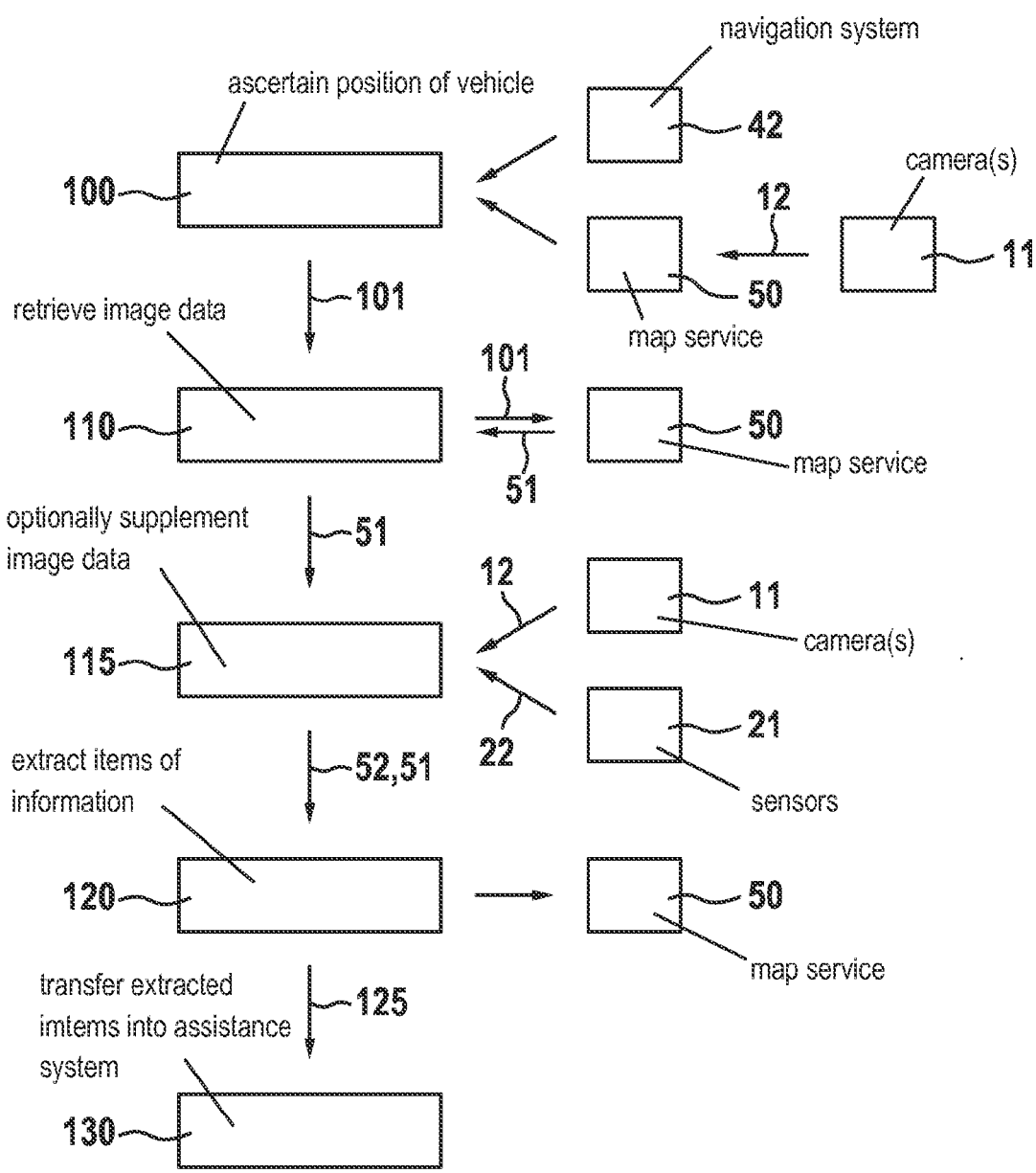
FIG. 1 schematically shows the sequence of an example method according to the present invention.

FIG. 1 schematically shows the sequence of an example method according to the present invention. In first step 100 of the method, the position of the vehicle is ascertained. For this purpose, depending on the availability, the data of a radio-based or satellite-based navigation system 42 and/or data of an image-data-based map service 50 are used. For the position determination with the aid of image-data-based map service 50, camera images 12 are recorded using one or multiple cameras 11 and compared to image-data-based map service 50. The images stored in image-data-based map service 50 are provided with data about the orientation and the recording location for a position determination. If an image matching with camera images 12 is found in map service 50 during the comparison in map service 50, the position and orientation of the vehicle is known. The position of the vehicle may also be ascertained via a radio-based or satellite-based navigation system. If the vehicle is in motion and position data are continuously ascertained via navigation system 42, the movement direction of the vehicle may be established and therefore the orientation of the vehicle may also be inferred. In other specific embodiments of the method, additional sensors may be used to determine the position and orientation of the vehicle, for example, a digital compass.

Position and orientation data 101 of the vehicle, which are ascertained in first method step 100, are used in second method step 110 to retrieve image data 51 of the vehicle surroundings from image-data-based map service 50.

Optionally, image data 51 retrieved from map service 50 are supplemented with additional data in an intermediate step 115. Depending on the specific embodiment of the method and equipment of the vehicle, camera images 12 from cameras 11 installed on the vehicle are used to supplement image data 51. If the vehicle is equipped with surroundings sensors 21, for example, ultrasound sensors, lidar sensors, or radar sensors, surroundings data 22 recorded therewith may also be used to supplement image data 51.

In third method step 120, items of information 125 are extracted from image data 51 or from image data 52 supplemented with camera images 12 and/or surroundings data 22. Conventional algorithms for image processing and object recognition are used for this purpose. In particular items of information about traffic signs, the location of obstructions, the location and height of the curb, the traffic routing, and the location of orientation of parking spaces in the surroundings of the vehicle are extracted from image data 51 or supplemented image data 52.

In last method step 130, extracted items of information 125 are transferred into the assistance system. In one embodiment of the method, an image, which is displayed to the driver, is prepared from image data 51 of map service 50 and optionally from camera images 12 and surroundings data 22 and also from items of information obtained therefrom. It is preferable to carry out the image display as a bird's eye view, in which the surroundings are displayed to the driver from an elevated perspective. In one preferred specific embodiment, the display contains information about possible parking spaces in the surroundings of the vehicle. The items of information about possible parking spaces, the traffic routing, and obstructions in the surroundings of the vehicle may be used by the assistance system, for example, for an assisted parking space entry or exit maneuver.

Figure 2:
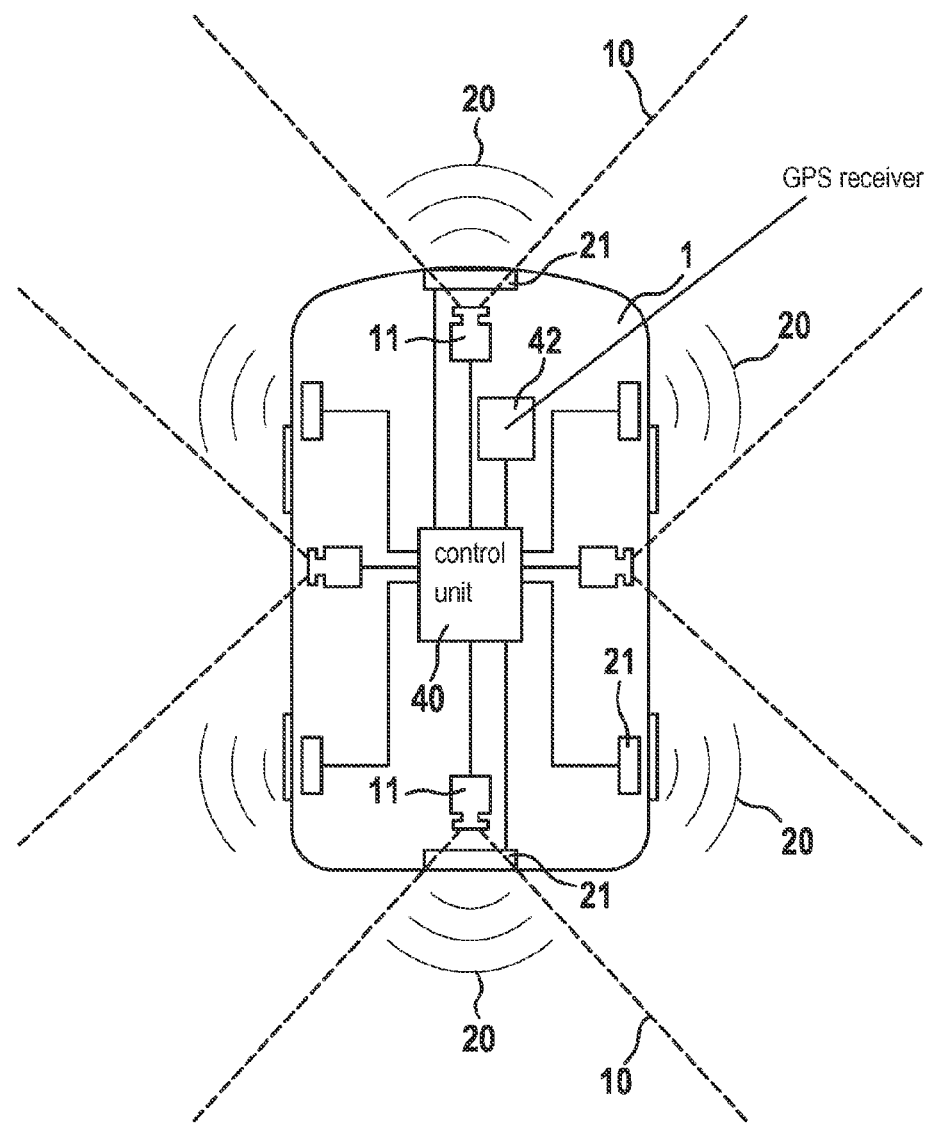
FIG. 2 shows the device according to the present invention installed in a vehicle having multiple cameras and surroundings sensors.

FIG. 2 shows a vehicle having the device according to the present invention. Vehicle 1 is equipped with multiple cameras 11, whose fields of vision 10 at least partially cover the surroundings of vehicle 1. In the specific embodiment shown in FIG. 2, vehicle 1 includes a front camera, a rear camera, and one side camera on each side.

Cameras 11 of vehicle 1 are connected to a control unit 40. Vehicle 1 furthermore has multiple surroundings sensors 21, which are also connected to control unit 40. In the specific embodiment shown in FIG. 2, vehicle 1 has surroundings sensors 21 in the front and rear and also two surroundings sensors, one on each side. Surroundings sensors 21 are designed here as ultrasound sensors. Control unit 40 may detect the precise location of obstructions in the closer surroundings of vehicle 1 by way of the ultrasound sensors. The detection range of the ultrasound sensors is indicated in each case with reference numeral 20. The fields of vision of cameras 11 are provided with reference numeral 10. In the specific embodiment shown in FIG. 2, a GPS receiver 42 is provided to control unit 40 for ascertaining the vehicle position. Inter alia, a computer unit and a connection to an image-data-based map service are contained in control unit 40.

Figure 3:
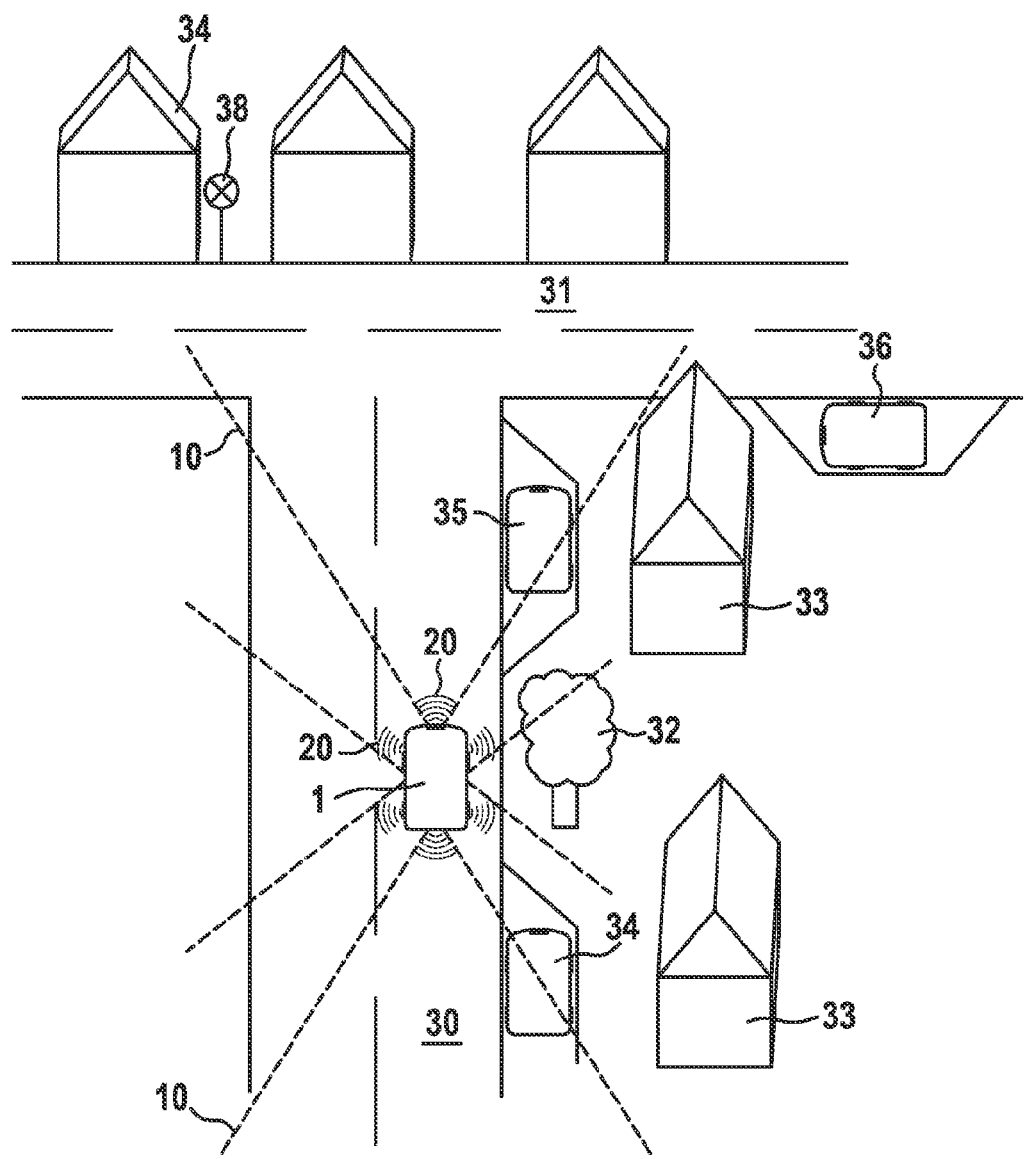
FIG. 3 shows the surroundings detection with the aid of the device according to the present invention.

FIG. 3 shows an image of the surroundings of the vehicle, which was obtained from image data of the map service, camera images, and surroundings data. In the situation shown, vehicle 1 travels on a road 30 in the direction of an intersection 31. Fields of vision 10, 20 of the various cameras and surroundings sensors of vehicle 1 are indicated in the image. It may be inferred from the indicated fields of vision that parking spaces 34 and 35 and tree 32 are directly visible by the sensors and cameras integrated into the vehicle. Houses 33 are partially concealed by tree 32. Houses 33 in turn conceal the view onto parking space 36. Houses 34 and traffic sign 38 are not concealed, but the distance to traffic sign 38 is too great to carry out a recognition of the sign only from a camera image.

To present a complete display of the surroundings to the driver, the position of vehicle 1 is initially ascertained. In the next step, image data of the vehicle surroundings are retrieved from the image-data-based map service. These image data are supplemented in an intermediate step using camera images of vehicle cameras 11 and the surroundings data of vehicle 1. In the third step of the method, items of information are extracted from the image data of the map service, which are transferred in the last step of the method into the assistance system. In the example shown, traffic sign 38 was recognized on the basis of the image data as a no stopping sign and parking space 36 was identified, which is not located in the field of vision of vehicle 1. In addition, the orientations and the precise location thereof were ascertained for parking spaces 34, 35, and 36.

The extracted items of information are fused together with the image data of the map service, the camera images, and the surroundings data to form a common image display, which is presented to the driver from an elevated perspective. In this way, the driver of vehicle 1 receives all relevant items of information about the surroundings in one look. In addition, all required data are available to begin a guided parking maneuver at the desire of the driver.

In one specific embodiment, the image display of the vehicle is designed in such a way that it may be increased or decreased in size at the desire of the driver.

By reducing the image display in size, a larger area of the surroundings of vehicle 1 becomes visible and the overview of the driver is improved. Areas of the image display which are located outside the viewing area of vehicle cameras 11 or surroundings sensors 21 are supplemented by images from the image-data-based map service. This supplementation is preferably carried out in such a way that a seamless transition of the various images results and the enlargement of the image display is continuously adjustable.

In the event of a strong reduction in size of the image display, it is possible to produce the image display exclusively on the basis of the image data of the map service. The transition between the various displays is preferably also carried out seamlessly.

The present invention is not restricted to the exemplary embodiments described here and the aspects emphasized therein. Rather, a variety of alterations are possible, which are routine measures for those skilled in the art.

What is claimed is:

1. A method for the transfer of data from an image-data-based map service for use in an assistance system of a vehicle, comprising:
    ascertaining at least one of: i) a position of the vehicle and ii) an orientation of the vehicle;
    retrieving image data of the vehicle surroundings from the image-data-based map service;
    extracting items of information from the image data of the map service; and
    transferring the items of information into the assistance system,
    wherein the ascertaining includes ascertaining the position of the vehicle, wherein during the ascertaining of the position of the vehicle, a comparison of camera images of the vehicle surroundings to the image-data-based map service is carried out, and
    wherein the position of the vehicle and at least one of the camera images and the surroundings data are compared to the image data of the map service, and the image data of the map service are updated in the event of recognized changes.

2. The method as recited in claim 1, wherein the image data of the map service are supplemented by camera images of the vehicle surroundings.

3. The method as recited in claim 1, wherein the image data of the map service are supplemented by surroundings data detected using surroundings sensors.

4. The method as recited in claim 3, wherein the image data of the map service are supplemented by camera images of the vehicle surroundings.

5. The method as recited in claim 3, wherein surround sensors include at least one of: an ultrasound sensor, a lidar sensor, and a radar sensor.

6. The method as recited in claim 1, wherein parking spaces in the surroundings of the vehicle are ascertained from the image data of the map service.

7. The method as recited in claim 6, wherein the parking spaces in the surroundings of the vehicle are ascertained from camera images of the vehicle surroundings.

8. The method as recited in claim 1, wherein at least one of traffic signs relating to no stopping and no parking zones, location of an obstruction, including trees, a location and height of a curb, and type and location of an intersection, are ascertained and analyzed in the image data.

9. The method as recited in claim 1, wherein at least one of traffic signs relating to no stopping and no parking zones, location of an obstruction, including trees, a location and height of a curb, and type and location of an intersection, are ascertained and analyzed in the image data and the camera images.

10. The method as recited in claim 1, wherein at least one of traffic signs relating to no stopping and no parking zones, location of an obstruction, including trees, a location and height of a curb, and type and location of an intersection, are ascertained and analyzed in the image data and the surroundings data.

11. The method as recited in claim 1, wherein data of at least one of a radio-based navigation system and a satellite-based navigation system are considered during the ascertainment of the position of the vehicle.

12. The method as recited in claim 1, wherein the image data of the map service are updated only if the change recognized by comparison has been recognized at least twice.

13. The method as recited in claim 12, wherein each recognition of a change is independent of another recognition of the change.

14. The method as recited in claim 1, wherein an image, which is displayed to the driver, is prepared from the image data of the map service and the camera images and the surroundings data and from items of information obtained therefrom, an image display being designed as a bird-s eye view or 3-D view and the display containing items of information about possible parking spaces in the surroundings of the vehicle.

15. The method as recited in claim 14, wherein the image display is designed so it may be increased and decreased in size, and if the image display is decreased in size, a seamless transition to a display exclusively produced from image data of the map service takes place.

16. The method as recited in claim 1, wherein the extracted items of information inform the driver about at least one of speed limits and pedestrian crossings.

17. A computer-readable storage medium storing a computer program for the transfer of data from an image-based map service for use in an assistance system of a vehicle, the computer program when executed by a computer, causing the computer to perform:
- ascertaining at least one of: i) a position of the vehicle and ii) an orientation of the vehicle,
- retrieving image data of the vehicle surroundings from the image-data-based map service;
- extracting items of information from the image data of the map service; and
- transferring the items of information into the assistance system,
- wherein the ascertaining includes ascertaining the position of the vehicle, wherein during the ascertaining of the position of the vehicle, a comparison of camera images of the vehicle surroundings to the image-data-based map service is carried out, and
- wherein the position of the vehicle and at least one of the camera images and the surroundings data are compared to the image data of the map service, and the image data of the map service are updated in the event of recognized changes.

18. A device for the transfer of data from an image-based map service for an assistance system of a vehicle, the device comprising a control unit configured to ascertain at least one of: i) a position of the vehicle and ii) an orientation of the vehicle, retrieve image data of the vehicle surroundings from the image-data-based map service, extract items of information from the image data of the map service, and transfer the items of information into the assistance system,
- wherein the ascertaining includes ascertaining the position of the vehicle, wherein during the ascertaining of the position of the vehicle, a comparison of camera images of the vehicle surroundings to the image-data-based map service is carried out, and
- wherein the position of the vehicle and at least one of the camera images and the surroundings data are compared to the image data of the map service, and the image data of the map service are updated in the event of recognized changes.

* * * * *